(No Model.)
R. P. BEATTY.
INKSTAND.
No. 379,093. Patented Mar. 6, 1888.
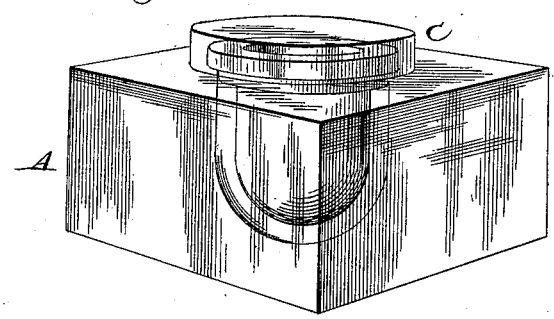
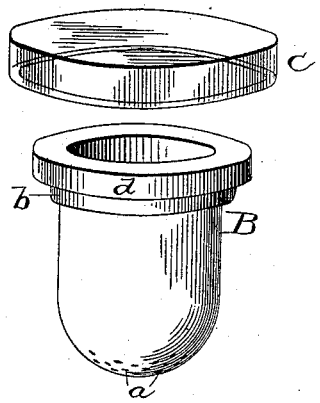
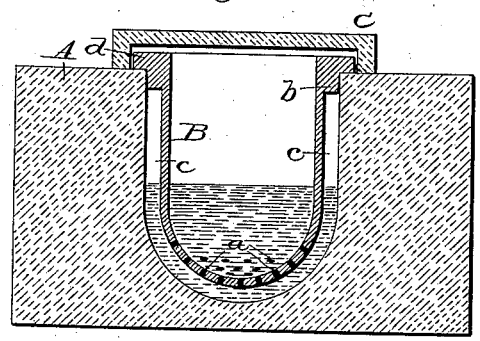
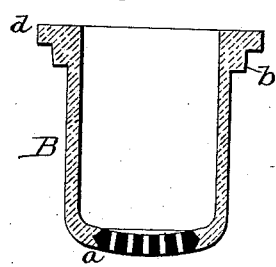
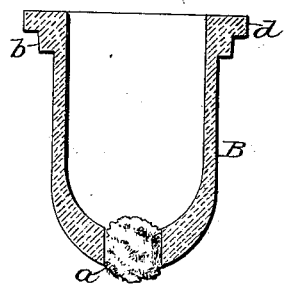
Witnesses:
James P. Duhamel
Walter S. Dodge
Robert P. Beatty,
Inventor,
by Dodge Son
his Attys.

UNITED STATES PATENT OFFICE.

ROBERT P. BEATTY, OF NORWALK, CONNECTICUT.

INKSTAND.

SPECIFICATION forming part of Letters Patent No. 379,093, dated March 6, 1888.

Application filed February 23, 1887. Serial No. 228,585. (No model.)

*To all whom it may concern:*

Be it known that I, ROBERT P. BEATTY, of Norwalk, in the county of Fairfield and State of Connecticut, have invented certain new and useful Improvements in Inkstands, of which the following is a specification.

My invention relates to ink stands or holders; and it consists in combining therewith a removable lining provided with one or more perforations sufficient to permit the passage of clear ink, but small enough or provided with porous material to prevent the passage of sediment.

In the annexed drawings, Figure 1 is a perspective view of an inkstand embodying my invention. Fig. 2 is a perspective view showing the parts separated. Fig. 3 is a vertical central section of the same; Figs. 4 and 5, sectional views of the removable lining, illustrating certain minor modifications.

It is well known that ink, when allowed to stand for any considerable length of time exposed to the atmosphere, becomes thick and filled with sediment, which it is difficult to remove without losing the good ink in which it is contained.

My invention is designed to provide for removing the sediment from time to time without disturbing or losing the good ink; and to this end it consists in providing the ink stand or holder A with a removable lining, as B, having one or more perforations, a, through which clear ink may pass, small enough to prevent, or provided with some material, as sponge, capable of preventing, sediment from passing through.

The form, proportion, and material of the ink stand or holder and of the lining may vary; but care should of course be taken to avoid the use of materials that are apt to be injuriously affected by the chemical action of the ink or that might affect the ink.

In the drawings, A indicates a glass inkstand of common form, and B the lining, which may be made of glass, metal, or alloy, plated, if necessary, to withstand the action of the ink, celluloid, rubber, or any material known in the arts as suitable for the purpose.

The lining B is advisably made somewhat smaller than the interior of the ink well or chamber, to avoid liability of adhering thereto and to afford a space for clear ink, where it may be free from exposure to the atmosphere while the cover C is removed. To cause the lining to stand away from the inner walls of the ink well or chamber, either the chamber or the lining may be provided with studs or projections, or the equivalent thereof. A continuous flange, b, may be formed upon either part, the drawings showing said flange as formed upon the lining, where it may be most conveniently made. This flange, which may be straight or tapering like a section of a cone, serves to center the lining within the ink well or chamber, and effectually excludes the air from the space c between the walls of the ink-well and lining.

At its upper end the lining is formed with a second flange, d, which extends horizontally outward and rests upon the top of the ink stand or holder A, where it serves to support the lining, to form a collar or neck for the cover C to fit around, and affords a hold for the fingers in removing the lining from the inkstand.

While not meaning to restrict myself to the use of any particular materials in the manufacture of the inkstand or lining, glass is preferred for both, because of its cheapness and its power of resisting the chemical action of the ink. But it is more or less difficult to produce such linings of glass with holes of small size. I propose in some cases to make the linings of glass with one large perforation, a, Figs. 4 and 5, and to place therein a suitable strainer or filter. This may be a perforated rubber disk, as in Fig. 4, a piece of sponge, as in Fig. 5, or any equivalent strainer calculated to hold back the sediment while permitting the ink to pass. Sponge will be found to answer well, since it remains soft so long as it is kept moist.

The lining, in any of the several equivalent forms above set forth, is placed within the ink well or chamber, the latter supplied with ink, and when sediment forms or collects within the lining the latter is lifted out, the clear ink allowed to drain off, and the lining emptied of the sediment, washed out, and replaced, whereupon the clear ink flows through the perforations and the inkstand is again ready for use.

A lead lining will withstand the action of most if not all inks.

I am aware that a sponge-cup has been provided with a perforated vessel supported by a spring, so that when the cover of the cup is raised the spring will throw the vessel up out of the water in the cup. My invention is totally different from this, not only in its construction, but also in the purposes for which it is designed and the manner in which it operates. It is obviously highly undesirable to stir the ink up every time the cover is raised and lowered, as the objects of my invention would be unattainable were such a construction used.

Having thus described my invention, what I claim is—

1. In combination with an inkstand, a removable perforated lining, B, the exterior of which is smaller than the interior of the ink well or chamber, and flanges $b$ $d$ at the upper end of the lining, as and for the purpose set forth.

2. In combination with an ink stand or holder, as A, a perforated lining, as B, materially smaller than the ink well or chamber of the inkstand, and provided with flange $b$, extending to the walls of the ink well or chamber, substantially as shown and described.

3. In combination with an ink stand or holder, a removable lining provided with a passage (one or more) for ink, and a filtering-body placed in said passage to prevent the passage of sediment.

4. The herein-described inkstand, comprising body A, removable perforated lining B, provided with flanges $b$ $d$, and a cover, C, all constructed substantially as shown and described.

In witness whereof I hereunto set my hand in the presence of two witnesses.

ROBERT P. BEATTY.

Witnesses:
ANDREW PARKER,
W. C. DODGE.